United States Patent [19]

Hou

[11] 4,144,041

[45] Mar. 13, 1979

[54] ADJUSTABLE THROAT VENTURI SCRUBBER

[76] Inventor: Karl L. Hou, 29 E. Maple St., Teaneck, N.J. 07666

[21] Appl. No.: 848,233

[22] Filed: Nov. 3, 1977

[51] Int. Cl.² .............................................. B01D 47/10
[52] U.S. Cl. ...................................... 55/226; 55/241; 138/45; 138/46; 261/112; 261/DIG. 54; 261/DIG. 56
[58] Field of Search ............... 261/DIG. 54, 115, 118, 261/DIG. 56, 112; 55/226, 240, 241; 138/45, 45 A, 46

[56] References Cited

U.S. PATENT DOCUMENTS

| | | | |
|---|---|---|---|
| 2,735,642 | 2/1956 | Norman | 138/45 |
| 2,998,198 | 8/1961 | Young | 138/45 |
| 3,214,903 | 11/1965 | Cochran | 138/45 |
| 3,350,076 | 10/1967 | Crommelin, Jr. | 261/DIG. 54 |
| 3,427,006 | 2/1969 | Oiestad | 261/DIG. 54 |
| 3,433,245 | 3/1969 | Cymbalisty | 138/46 |
| 3,556,489 | 1/1971 | Ueda | 261/DIG. 54 |
| 3,638,925 | 2/1972 | Braemer | 261/DIG. 54 |
| 3,690,044 | 9/1972 | Boresta | 261/DIG. 54 |
| 3,696,590 | 10/1972 | Richmond | 261/DIG. 54 |
| 3,707,067 | 12/1972 | Dietrick | 261/DIG. 54 |
| 3,724,503 | 4/1973 | Cooke | 138/45 |
| 3,729,898 | 5/1973 | Richardson | 261/DIG. 54 |
| 3,767,174 | 10/1973 | Heeney | 261/DIG. 54 |
| 3,820,307 | 6/1974 | Hausberg et al. | 261/DIG. 54 |
| 3,898,308 | 8/1975 | Baum | 261/DIG. 54 |

*Primary Examiner*—Frank W. Lutter
*Assistant Examiner*—Gregory N. Clements
*Attorney, Agent, or Firm*—Kirschstein, Kirschstein, Ottinger & Cobrin

[57] ABSTRACT

A venturi scrubber for the scrubbing of an inlet gas stream with a scrubbing liquid or slurry, to remove gaseous or vaporous components from the gas stream, or to remove entrained solid particulate or discrete liquid droplet (fog or mist) constituents, and thereby to prevent air pollution and/or to recover the component or constituent. The venturi scrubber has an adjustable throat characterized by the provision of structure to adjust the cross-sectional dimension of the gas passage at or adjacent to the throat section. The structure includes at least one movable baffle at the periphery of the gas passage, and a container. The container is disposed external to and contiguous with the baffle, and a controlled amount of a fluid is passed into the container so that the internal fluid pressure within the container, and resultant volumetric dimension of the container, and thereby also the resultant displacement of the baffle relative to the periphery of the throat section, are adjustable in proportion to a change in the flow rate of the inlet gas stream.

26 Claims, 20 Drawing Figures

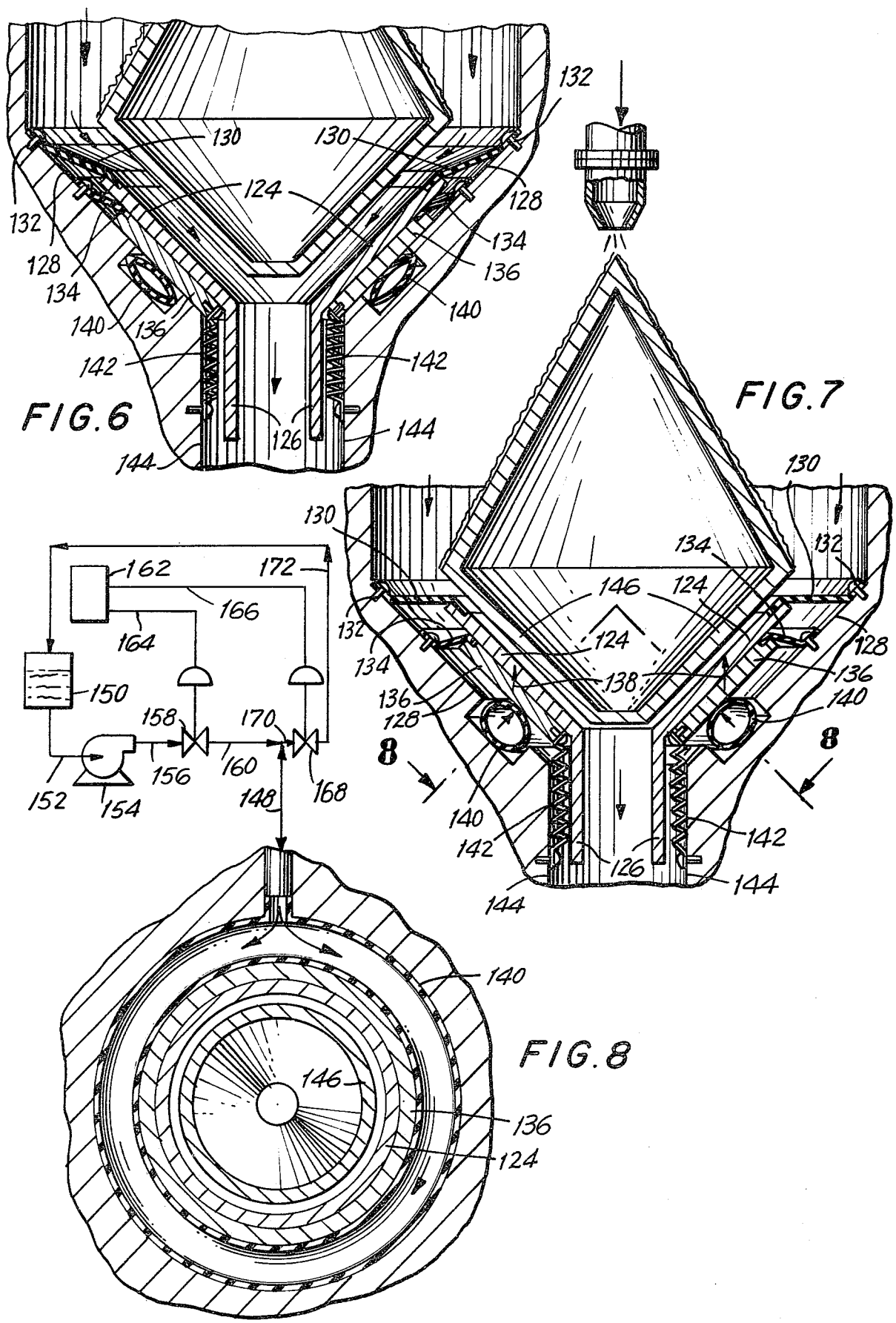

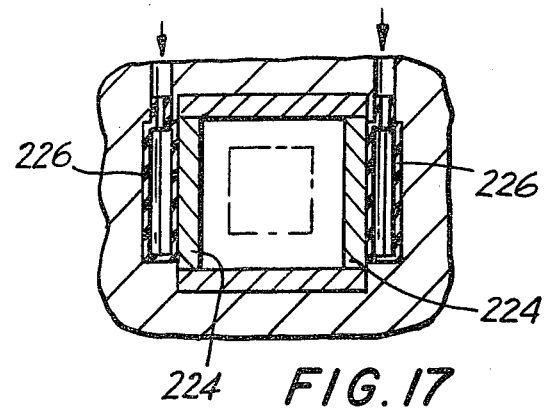
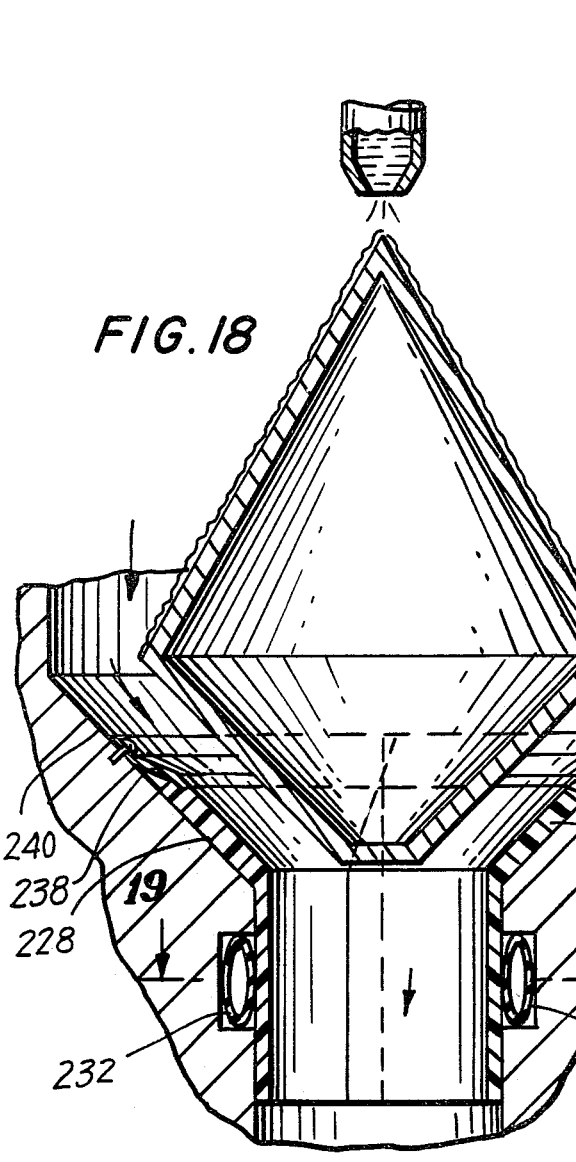
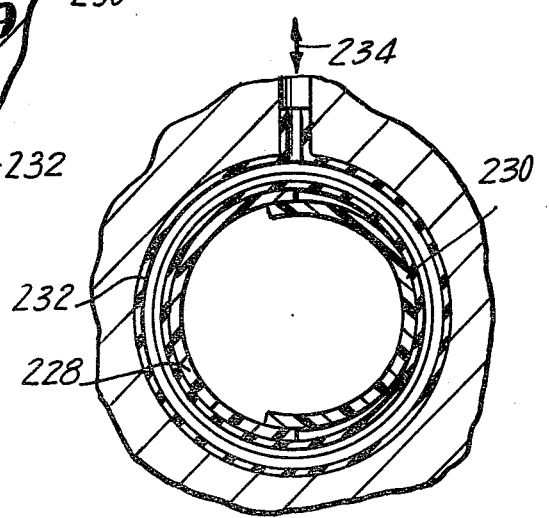
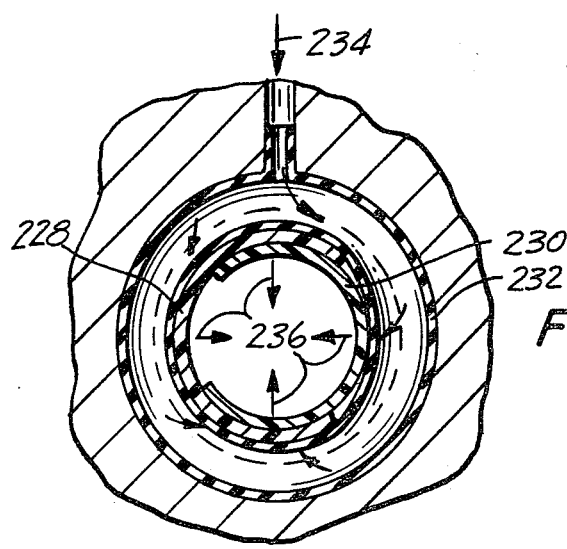

ADJUSTABLE THROAT VENTURI SCRUBBER

BACKGROUND OF THE INVENTION

1. Field of the Invention

An adjustable throat venturi scrubber for the scrubbing of gas streams with a liquid or slurry.

2. Description of the Prior Art

Venturi scrubbers of various configurations are shown in U.S. Pat. Nos. 3,440,803; 3,544,086; 3,567,194; and 3,584,440. Other devices which provide a venturi passage or venturi-like scrubbing effect are those of U.S. Pat. Nos. 3,317,197; 3,262,685; 3,085,793; 3,116,348; and 2,604,185. Other devices and apparatus assemblages relative to gas washing or dispersion of a liquid into a gas includes U.S. Pat. Nos. 2,414,718; 3,045,990; 2,409,088; 2,354,678; 2,661,195; 3,323,290; 2,086,671; 2,575,359; 2,033,404; 3,077,714; and Canadian Pat. Nos. 684,884 and 670,150.

Adjustable throat venturi scrubbers in which a baffle disposed at or adjacent to the throat is adjusted by mechanical linkages, or by a central vertical support shaft in the case of annular venturi scrubbers, or by other mechanical means, are known to the art. In general, the adjustable throat mechanism senses a change in the pressure drop of gas flow through or across the scrubber, which change takes place because of a change in gas volumetric flow rate or other factors, and adjusts the throat configuration in proportion, so as to attain a generally constant gas pressure drop, and thereby to attain uniform scrubbing of the gas stream in the venturi scrubber. A typical arrangement of this nature is described in U.S. Pat. No. 3,690,044.

SUMMARY OF THE INVENTION

1. Purposes of the Invention

It is an object of the present invention to provide an improved adjustable throat venturi scrubber.

Another object is to provide an adjustable throat venturi scrubber in which the adjustment in the throat dimension for changes in gas flow rate may be more accurately and rapidly made.

A further object is to provide an adjustable throat venturi scrubber in which the means for changing the throat dimension is more reliable and precise than prior art configurations.

An additional object is to provide an adjustable throat venturi scrubber in which the adjustment means is not subject to failure due to clogging, jamming, mechanical breakdown, corrosion or the like.

Still another object is to provide an adjustable throat venturi scrubber in which the adjustment of throat dimension is by means of transmitted change in fluid pressure within a flexible resilient container juxtaposed with a throat baffle and external to the gas passage, rather than by mechanical linkages.

Still a further object is to provide an adjustable throat venturi scrubber in which a change in gas pressure drop through the venturi scrubber, which takes place in response to change in gas volumetric flow rate, temperature, density or the like, may be correlated with the pressure of a fluid within a flexible resilient container so oriented as to correspondingly displace a baffle in the adjustable throat of the venturi scrubber.

It is a general object of the invention to provide an improved apparatus for scrubbing a gas stream with a liquid scrubbing medium, in order to remove contaminants from the gas stream.

Still an additional object is to provide an improved venturi scrubber with an adjustable throat, for scrubbing gas streams.

An object is to provide an adjustable throat venturi scrubber which may be adjusted or modified to compensate for variations in gas flow rate or to produce a desired degree of gas scrubbing effectiveness.

These and other objects and advantages of the present invention will become evident from the description which follows.

2. Brief Description of the Invention

In the present invention, the adjustable throat venturi scrubber for the scrubbing of a gas stream with a liquid includes structure which acccomplishes the adjustability of the venturi throat in a new manner using structure which has heretofore not been utilized for this purpose. The adjustment means to adjust the cross-sectional dimension of the gas passage at or adjacent to the throat section of the venturi scrubber includes at least one movable baffle at the periphery of the gas passage, and a container. The container is disposed external to and contiguous with the movable baffle, and the container is composed of a flexible and resilient material, typically a synthetic rubber such as hypalon, buna, neoprene, a deformable plastic, or natural rubber. Means such as a pump and a tube leading from the pump to the container are provided to pass a controlled amount of a fluid into the container, so that the internal fluid pressure within the container and resultant volumetric dimension of the container, and thereby the resultant displacement of the baffle relative to the periphery of the throat section of the venturi passage, are adjustable in proportion to a change in the flow rate of the inlet gas stream flowing into the venturi passage to be scrubbed. In other words, displacement of the baffle causes a change in the cross-sectional dimension of the throat section, so that when the effective gas flow rate diminishes, the throat section will be narrowed, diminished, or reduced in cross-sectional area, so as to maintain gas scrubbing efficiency, and likewise when the effective gas flow rate increases, the throat section will be enlarged accordingly, so that gas scrubbing efficiency is maintained substantially constant. Within the context of the present invention, it will be understood that change in the effective gas flow rate refers not only to change in the volumetric flow rate per se, but also to a change in the gas density, temperature, pressure, or other operating parameters.

The flexible and resilient container will in general be expandable and will be composed of any suitable material such as those mentioned supra. In this regard, it will be understood by those skilled in the art that any rubbery or rubber-like elastic material may be employed to fabricate the container. Thus, hypalon is defined as a rubbery material obtained by the chlorination and sulfonation of polyethylene. Buna is defined as a rubber substitute prepared by the polymerization or copolymerization of butadiene. Neoprene is defined as polychloroprene made by the polymerization of chloroprene, i.e. neoprene is a generic name for synthetic rubber made by polymerization of 2-chloro-1,3-butadiene (prepared by the action of hydrogen chloride on monovinylacetylene).

With regard to the fluid employed to deform, i.e. expand or contract, the flexible resilient container, this fluid may be a gas such as air, nitrogen, carbon dioxide, or mixtures thereof. The fluid may be a liquid such as water, a hydrocarbon oil such as motor oil or a lower paraffinic hydrocarbon or an aromatic hydrocarbon such as benzene or toluene, a halogenated hydrocarbon such as various types of freons, a hydraulic brake fluid such as those which comply with Federal motor vehicle safety standard MVSS-116 and surpass SAE Spec. J 1703 and Federal Spec. VV-B-680, or those high performance hydraulic brake fluids of a similar nature but which have a minimum dry boiling point of 450° F. and a minimum wet boiling point of 284° F. and contain polyalkylene glycol ether, a silicone oil, or any other suitable liquid. Many other feasible liquids may be mentioned, such as anhydrous or aqueous lower aliphatic alcohols such as methanol, ethanol, propanol, isopropanol, butanol, etc. A principal consideration in the selection of the working fluid is that it must be compatible with the particular material of construction of the container, as well as being resistant to breakdown or degradation due to pressure changes, exposure to elevated temperature, etc. Thus, in many instances, a hydraulic brake fluid or a silicone oil will be exemplary.

With regard to the configuration of the venturi scrubber per se, the unit in general will include an approach section and a throat section. The approach section is a converging gas passage which terminates at and is connected to the throat section, with the throat section depending from the approach section and being a gas passage having a restricted cross-sectional area. Suitable means such as a fan, blower or the like are provided to pass an inlet gas stream successively through the approach section and the throat section, so that the gas stream is accelerated to a high velocity in the throat section. Suitable means such as a nozzle or plurality of nozzles, as described in U.S. Pat. No. 2,604,185, a projection lip as described in U.S. Pat. Nos. 3,567,194 and 3,440,803, or the like, are provided to project a scrubbing liquid stream into the gas stream at or adjacent to the throat section. In most instances, the scrubbing liquid is projected generally transversely into the gas stream. In this manner the scrubbing liquid stream is comminuted into a plurality of discrete small liquid droplets within the gas stream and the gas stream is thereby scrubbed to remove a component or constituent from the gas stream, usually in the interest of prevention of air pollution.

Thus, an exemplary application of the invention is to the scrubbing of flue or stack gases emanating from power plants in which coal or oil is burned to generate steam in a boiler. In this case, air pollution regulations usually require that the waste stack or flue gas must be treated prior to discharge to the atmosphere, in order to remove both gaseous sulfur dioxide and solid particulate fly ash. As will appear infra, the most economical technique to accomplish this is to scrub the gas with an aqueous alkaline scrubbing liquid or slurry, which removes sulfur dioxide (an acidic gas) in the form of a dissolved sulfite, and which concomitantly removes fly ash to an acceptable level, so that the waste gas may now be safely discharged to the atmosphere without causing harm to humans or to the environment in general.

The venturi scrubber in general is completed by the provision of means downstream from the throat section to separate the resulting gas-liquid mixture into a scrubbed gas phase and a scrubbing liquid phase containing a component removed from the inlet gas stream. The separation means generally consists of a baffled or cyclonic gas-liquid separation container. Means such as a conduit or duct are provided to pass the gas-liquid mixture from the venturi scrubber into the separation container, so that the scrubbed gas phase and the scrubbing liquid phase containing the removed component are formed within the gas-liquid separation container. The scrubbed gas is generally discharged from the container to atmosphere, sometimes with an intermediate heating of the gas, known as reheat, to facilitate atmospheric dispersion. The scrubbing liquid or slurry may be discharged to waste disposal or processed for recycle to further gas scrubbing, after removal of the component in concentrated form.

Typically, the venturi gas passage may be of circular cross-section. In this case, and especially when large volumes of gas are being scrubbed, a central substantially conical baffle is provided in the approach section, so that an annular gas passage is provided in the approach section. In many instances, the central conical baffle will be frusto-conical. In the interest of reduction of gas pressure drop through the scrubber, turbulence may be prevented by providing an inverted substantially conical baffle dependent from the central conical baffle; and in many instances the inverted conical baffle will be frusto-conical.

Alternatively, the venturi scrubber gas passage may be of any suitable configuration other than of circular cross-section. Thus, a rectangular cross-sectional gas passage is exemplary, e.g. a gas passage of square cross-section.

In a preferred embodiment, the movable baffle is disposed about the periphery of the throat section of the venturi gas passage and may extend about the periphery of the approach section adjacent to the throat section. In any event, it is preferred that the movable baffle be composed of two connected sections, with a first baffle section being disposed in the terminal portion of the approach section and a second baffle section being in the inlet portion of the throat section. In this configuration of the invention, in a preferred embodiment an auxiliary baffle is disposed between the first baffle section and the terminal portion of the approach section, with the container being disposed external to the auxiliary baffle. In this case, the terminal edges of the auxiliary baffle will be connected to the inner wall of the gas passage at or adjacent to the throat section by at least one fluid-impervious connection, with at least a portion of the fluid-impervious connection being expandable to accommodate for displacement of the auxiliary baffle relative to the inner wall of the gas passage.

As mentioned supra, in many instances the component removed from the inlet gas stream will be gaseous sulfur dioxide, which is an atmospheric pollutant removed in the interest of protection of the environment. In this case, the scrubbing liquid stream may be an aqueous alkaline solution in which virtually any alkaline media may be dissolved. Typically, the scrubbing liquid solution is an aqueous solution containing a dissolved hydroxide, sulfite or carbonate of an alkaline or alkaline earth element such as sodium, potassium, lithium, magnesium, calcium or barium. In other cases, the dissolved alkaline component may be ammonia. Within the context of the present invention, it will be understood that reference to a scrubbing liquid stream encompasses and includes a slurry. Thus, the scrubbing liquid stream may be an aqueous slurry containing discrete solid particles of an oxide, hydroxide, sulfite or carbonate of an alkaline earth element such as magnesium, calcium or barium. It will be understood that in most instances of scrubbing a gas stream to remove sulfur dioxide, the reaction mechanism is a chemical reaction between the sulfur dioxide and the alkaline component to form, in situ, a sulfite and/or a bisulfite of the alkaline or alkaline earth element.

In other instances, the component to be removed from the inlet gas stream is a plurality of discrete solid particles initially entrained in the inlet gas stream, e.g. fly ash, as mentioned supra. Other types of discrete solid particles such as chemical dust, carbon black, soot, iron oxide particles, etc. may be handled in the device. Mists or fogs of an acidic droplet nature or other types of deleterious constituents may also be removed from a gas stream in the venturi scrubber. In some cases the component or constituent to be removed in a valuable material or chemical, and the scrubbing medium is subsequently processed to recover the component or constituent. In other cases, as with the use of lime slurry to remove sulfur dioxide from waste stack or flue gases, the spent scrubbing medium is simply passed to suitable waste disposal, such as by stabilizing the spent lime slurry containing calcium sulfite via the addition of solid particulate fly ash, as described in U.S. Pat. No. 3,785,840, or addition of other suitable stabilizing agents such as cement. In any case, it will be appreciated that the venturi scrubber in many instances is applied to the concomitant removal of both a gaseous or vaporous component of a gas stream and entrained discrete solid particles in the gas stream.

In most instances, when the venturi passage is of circular cross-section, the approach section will consist of an inverted frusto-conical baffle. In most cases, a diverging gas passage will depend or extend from the throat section of the venturi section, to prevent turbulence and attain reduced overall gas pressure drop through the device. This diverging gas passage is typically a frusto-conical or frusto-pyramidal baffle. Finally, in a preferred embodiment, the invention is applicable to a venturi configuration in which the venturi scrubber consists of a plurality of parallel vertical gas scrubbing passages, typically as shown in U.S. Pat. No. 3,440,803. In this case, the specific venturi scrubber of the invention will be one of the plurality of parallel vertical gas scrubbing passages, with the parallel vertical gas scrubbing passages being oblong substantially linear passages juxtaposed across the path of inlet gas stream flow in a common horizontal plane.

The present adjustable throat venturi scrubber provides several salient advantages. The device is not subject to clogging, plugging, corrosion or wear as was the case with prior art adjustable venturi configurations. Since the container is displaced from direct contact with the gas stream, problems such as attrition, excessive frictional wear, adverse temperature changes, etc. are also avoided. The present device is relatively simple and is of low cost, and may be readily fabricated and installed. The device provides a fully adjustable venturi scrubber in which the venturi throat may be accurately and rapidly adjusted to accommodate for changes in gas volumetric flow rate, temperature, density, etc. Thus, a uniform gas scrubbing efficiency is attained regardless of these changes, and air pollution is effectively prevented.

The invention accordingly consists in the features of construction, combination of elements and arrangement of parts which will be exemplified in the device hereinafter described and of which the scope of application will be indicated in the appended claims.

BRIEF DESCRIPTION OF THE DRAWINGS

In the accompanying drawings in which are shown several of the various possible embodiments of the invention:

FIG. 6 is a sectional elevation view of a more complex preferred embodiment of the invention;

FIG. 7 shows the embodiment of FIG. 6 in sectional elevation view with the container inflated and the throat constricted;

FIG. 8 is a sectional plan view taken substantially along the line 8—8 of FIG. 7;

FIG. 17 is a sectional plan view of still another alternative embodiment of the invention;

FIG. 18 is a sectional elevation view of still another alternative version of the invention;

FIG. 19 is a sectional plan view taken substantially along the line 19—19 of FIG. 18; and FIG. 20 is a sectional plan view similar to FIG. 19 but with the annular or doughnut-shaped container inflated so as to constrict the venturi throat.

DETAILED DESCRIPTION OF THE PREFERRED EMBODIMENTS

Figures 1, 2, 3:
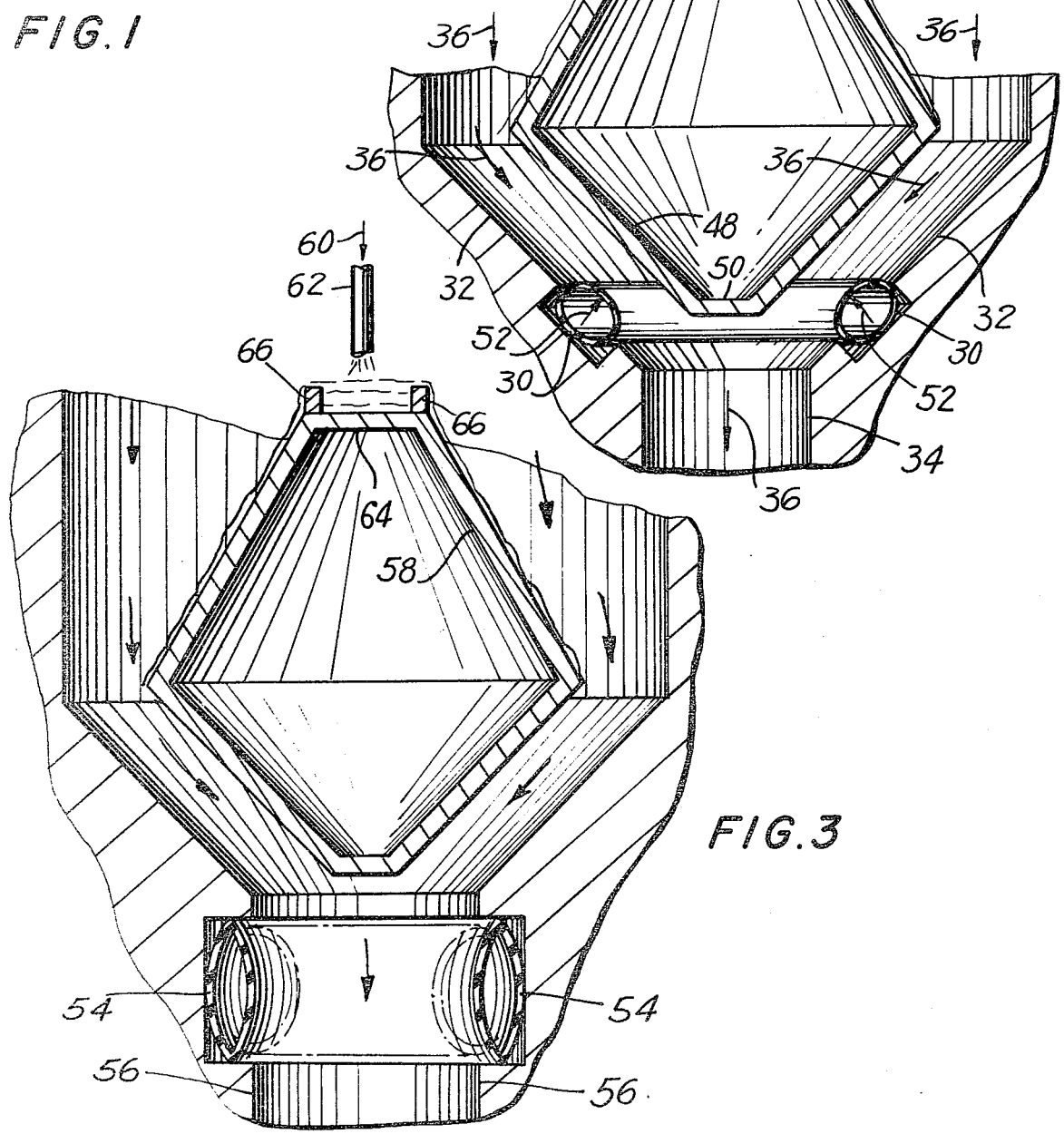
FIG. 1 is a sectional elevation view showing a simplified elementary version of the invention.
FIG. 2 shows the FIG. 1 embodiment with the container inflated.
FIG. 3 illustrates, in sectional elevation view, an alternative simplified elementary version of the invention.
Figures 4, 5:
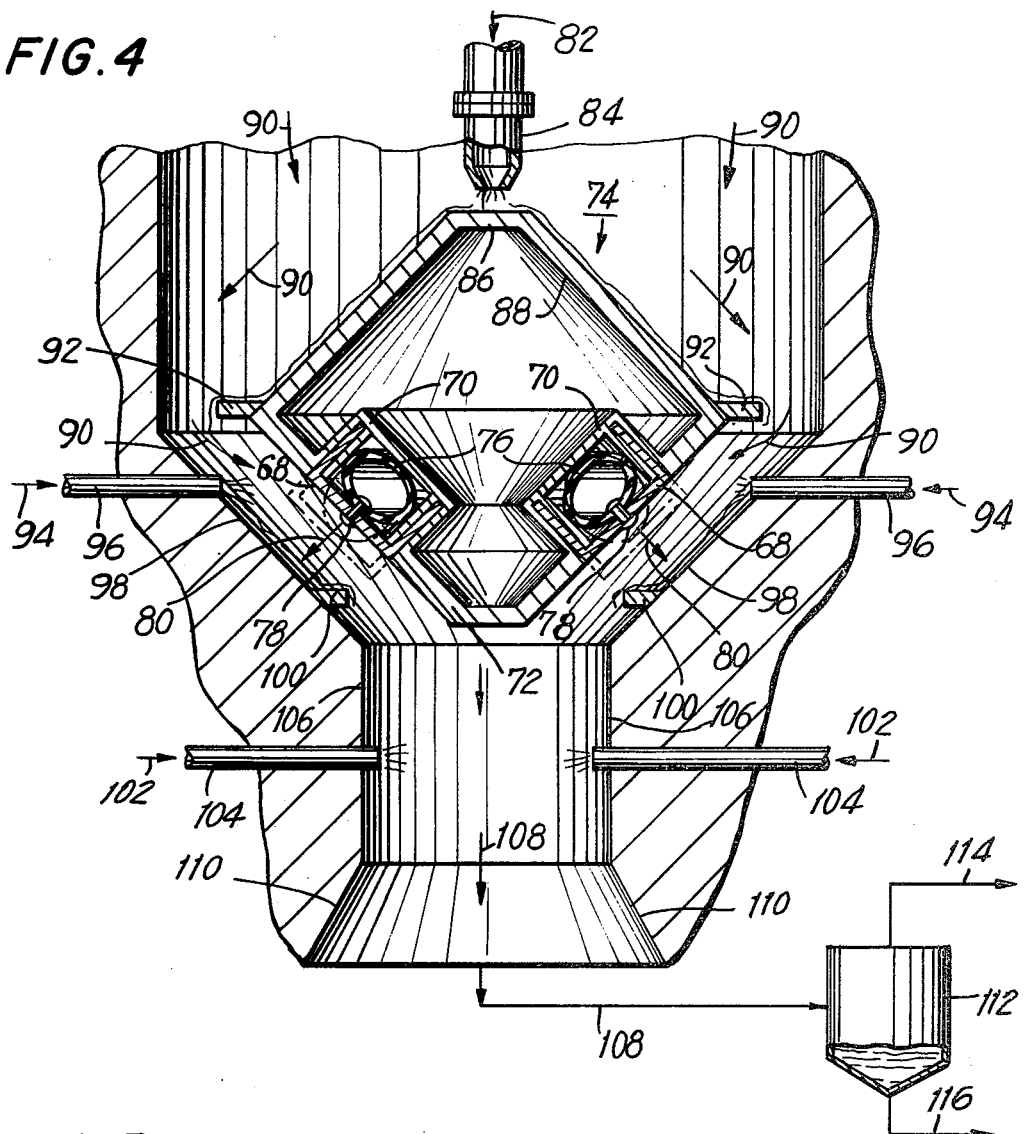
FIG. 4 shows, in sectional elevation view, a more sophisticated and comlex version of the invention.
FIG. 5 is a sectional elevation view of another alternative simplified version of the invention.

Referring now to FIGS. 1 and 2, the provision of an expandable container per se as a means of flow constriction in the approach section of the venturi scrubber is shown. Such a configuration, which also appears in other embodiments as shown in FIGS. 3 and 5, would be feasible when the scrubbing liquid is free of entrained solid particles, i.e. is not a slurry, and also when the component to be removed from the gas stream to be scrubbed does not entail or include entrained solid particles. In other words, where the system does not include or contain entrained solid particles, so that abrasion or attrition is not encountered is service, the FIGS. 1, 2, 3 and 5 embodiments of the invention are feasible. Typical instances of this nature include the scrubbing of stack or flue gases for sulfur dioxide removal using an aqueous alkaline solution, where prior processing of the stack or flue gas includes removal of fly ash, e.g. using an electrostatic precipitator. Other instances where the gas stream could be treated in accordance with the FIGS. 1, 2, 3 or 5 embodiments include when the gas stream contains a mist or fog of entrained liquid particles, e.g. in a sulfuric acid plant where the tail gas from the absorption tower must be treated to remove acid mist, or when the gas stream contains a gaseous component which is deleterious, e.g. the tail gas from the absorption tower in a nitric acid plant which contains nitrogen oxides generally referred to as $NO_x$. In other words, in numerous instances, an expandable container per se could be disposed at or adjacent to the periphery of the constricted gas passage in the venturi scrubber, either in the approach section as in FIGS. 1 and 2 or in the throat as in FIGS. 3 and 5, as that the expandable container per se in these embodiments is the means for modifying the dimension of the venturi scrubber, e.g. the throat cross-sectional area, in proportion to a change in the flow rate of the inlet gas stream.

In FIGS. 1 and 2, as mentioned supra, the expandable container 30 is disposed in the approach section 32 of the annular venturi scrubber, which also has a throat section 34 of restricted cross-sectional area for intimate contact between liquid droplets and the gas stream 36, which is accelerated to high velocity in the approach section 32 and flows at this high velocity through the throat section 34. A scrubbing liquid stream 38 (FIG. 2) passes via duct or pipe 40 into nozzle 42, which is typically a spray nozzle and which disperses stream 38 onto the central plumb bob element 44, which element 44 provides annular flow and makes the unit an annular venturi scrubber. The element 44 includes an upper conical baffle 46 from which a lower inverted frusto-conical baffle 48 depends. The baffle 48 is provided with a truncated apex 50. The liquid stream 38 thus flows downwards as a liquid film or layer on the outer surface of baffle 46, and is projected and dispersed into the gas stream 36 at the interface between the baffles 46 and 48 and also in the approach section 32 and the throat section 34, so that effective gas scrubbing takes place. It will be appreciated that in suitable instances, such as when a low volumetric flow rate of gas is to be scrubbed, instead of the venturi passage being an annular venturi, a conventional venturi configuration without elements 46, 48 and 50 may be provided.

In accordance with the present invention, FIG. 2 shows the doughnut or torus-shaped container 30 after inflation due to the introduction of a suitable fluid as described supra. The inflating of container 30 results in a displacement of the dimension of the container in the direction shown by arrows 52 (FIG. 2) as compared to the deflated dimension of container 30 as shown in FIG. 1, so that the dimension and cross-section of the approach section is reduced adjacent to container 30 in FIG. 2, and so that fluid flow is thereby constricted. This produces, typically when the flow rate of stream 36 is reduced, a uniform or greater gas scrubbing efficiency.

FIG. 3 shows a container 54 disposed in a throat section 56 of an annular venturi scrubber. The phantom outline shows container 54 in an enlarged torus shape due to passage of fluid into container 54, with concomitant constriction of the effective cross-sectional area of the throat section 56. FIG. 3 also shows an alternative means of introduction of scrubbing liquid onto upper baffle 58, which in this embodiment is a frustoconical baffle. The scrubbing liquid stream 60 passes via pipe or duct 62 onto the upper surface of the truncated apex 64 of baffle 58. The periphery of element 64 is defined by a weir 66, so that stream 60 flows uniformly over the upper edge of weir 66 and onto the outer surface of baffle 58.

FIG. 4 shows an embodiment of the invention in which a protective baffle is provided in conjunction with the inflatable container, as well as transverse scrubbing liquid injection into the throat via a plurality of annular pipes. The protective baffle feature of FIG. 4 entails the provision of a U-shaped channel baffle 68 which is slidably mounted in lateral grooves in a channel frame-work 70, which in turn is integrally attached to and forms a part of the inverted frusto-conical baffle 72, which is a member of the central plumb bob 74 of the annular venturi scrubber. A container 76 is enclosed by the members 68 and 70 and is attached to the movable member 68 by any suitable fastening such as rivets 78. The arrows 80 indicate the direction of motion of the channel baffle 68 and outer side of container 76, to the position shown in phantom outline at which disposition the approach section is throttled or constricted, when a fluid is passed under pressure into container 76.

Various other aspects of a typical gas scrubbing system are shown in FIG. 4. Thus, scrubbing liquid stream 82 is passed via nozzle 84 onto the truncated apex 86 of upper frusto-conical baffle 88, and stream 82 flows downwards on the outer surface of baffle 88 and is projected into the gas stream 90 by an annular horizontal lip 92 which is provided at the interface between baffles 72 and 88. Further scrubbing liquid streams 94 are passed via pipes 96 onto the surface of the converging approach section 98, and streams 94 flowing downwards on the surface of section 98 are projected into the gas stream by an annular horizontal lip 100 provided at or adjacent to the lower terminus of section 98. Still further scrubbing liquid streams 102 are passed via pipes 104 transversely into the throat section 106 of the venturi scrubber for further gas scrubbing. In each case, the scrubbing liquid stream 82, 94 or 102 is dispersed into a plurality of small liquid droplets and scrubs the gas stream, so that a resultant mixed gas-liquid droplets stream 108 is discharged downwards from throat section 106. Stream 108 first flows through a divergent gas passage section 110 for pressure drop regain by virtue of reduced turbulence, and thereafter the mixed fluids stream 108 passes laterally into cyclonic gas-liquid separator 112, which separates the stream 108 into scrubbed gas stream 114 and spent scrubbing liquid stream 116.

FIG. 5 illustrates an embodiment of the invention in which a plurality of parallel venturi gas passages are provided, for scrubbing large gas volumes with minimum gas pressure drop. Each gas stream portion 118 flows through a separate venturi passage 120, which passages 120 are each an oblong linear passage disposed transversely to gas flow. In other words, passages 120 are parallel venturi gas scrubbing passages arrayed side by side. In the FIG. 5 embodiment, the containers 122 are disposed along the sides of the throat sections of the venturi passages 120. No movable baffles are provided in conjunction with containers 122. The phantom outlines show the displacement of the containers 122 when expanded into the respective throat sections when fluid under pressure is passed into the containers 122.

FIGS. 6, 7 and 8 show a preferred embodiment of the invention, in which a baffle and an auxiliary baffle are provided in conjunction with the container. The main baffle which constricts the approach section and/or the throat of the venturi scrubber is composed of an upper section 124 in the approach section and a lower section 126 in the throat section of the venturi scrubber. The section 124 is connected at its upper end to the wall of the approach section 128 of the venturi scrubber by a flexible resilient connector strip 130 which is attached to the surface of approach section 128 in a fluid-impervious connection in any suitable manner, e.g. by rivets 132. A similar flexible resilient connector strip 134 connects the upper end of auxiliary baffle 136 to the surface of approach section 126 in a fluid-impervious connection. The auxiliary baffle 136 is rendered freely displaceable upwards in the direction shown by arrows 138 upon expansion of container 140 (FIG. 7), by the provision of a lower bellows or accordian type expansible diaphragm connection 142 between the lower end of auxiliary baffle 136 and the inner wall of throat section 144 of the venturi scrubber. The end connections of the accordian-type diaphragm 142 to, respectively, auxiliary baffle 136 and throat section 144, are also fluid-impervious, so that the container 140 is protected against contact with the components of the gas stream and/or the scrubbing liquid which may be corrosive and/or erosive. Basically, FIG. 7 shows constriction of the approach section between baffle 124 and an inverted frusto-conical baffle 146 of the central plumb-bob element which makes the venturi passage into an annular venturi scrubber. It will be apparent, as will appear infra, that in suitable instances a similar constriction of the throat section may be accomplished, by the provision of baffles of a suitable configuration and arrangement.

FIG. 8 shows details of a typical control circuit for ingress of pressurizing fluid into, or egress of pressurizing fluid out of, the container 140, via stream 148. Ingress of pressurizing fluid, in this case a liquid disposed in tank 150, takes place via stream 152, pump 154, stream 156 which is controlled and throttled by control valve 158, and stream 160 which passes via stream 148 into container 140 when reduction in the dimension of the approach section is desired due to diminished gas flow rate or the like. The reduction in gas flow rate is sensed by a sensor 162 which may be an orifice or pitot tube in the gas line, a temperature or pressure sensor disposed at a suitable location in the system, or the like. The sensor 162 transmits a signal, which may be pneumatic, electronic, or the like, via 164 to control valve 158 to open this valve, and concomitantly via 166 to a control valve 168 to throttle or close the pressure relief line 170. When it is desired to adjust the approach section dimension to a more wide open position, by downwards displacement of baffle 124, the sensor 162 sends signal via 164 to throttle or close valve 158 and/or to shut off or slow down pump 154, and concomitantly via 166 to open valve 168 so that the pressurizing liquid in container 140 now flows out of container 140 in a reverse direction via 148 to stream 170, through valve 168 and stream 172 to tank 150. Thus the pressure is relieved within container 140 and this container 140 contracts (per FIG. 6), thus permitting baffles 124 and 136 to move downwards. Although the extremes of open and throttled gas flow have been shown, respectively, in FIGS. 6 and 7, it will be evident that any intermediate controlled position of the baffles 124 and 136 may be attained by appropriate control of the fluid pressure within container 140 at an intermediate level via appropriate settings of the control valves 158 and 168.

Figure 9:
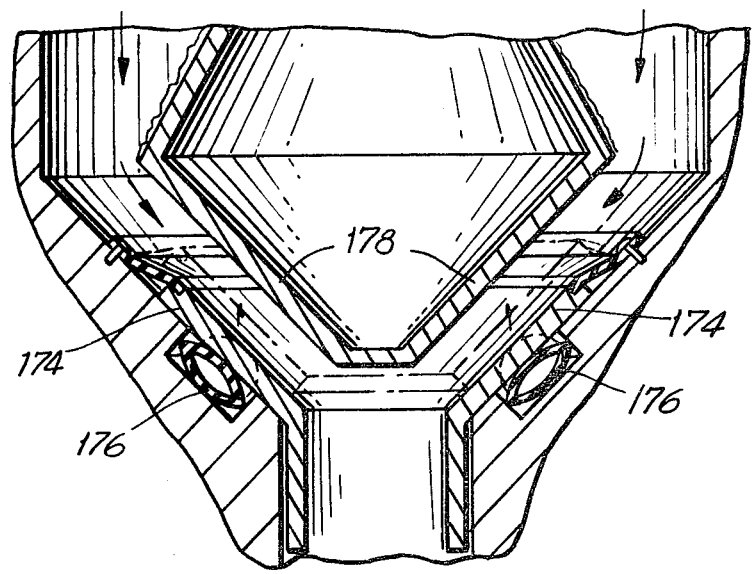
FIG. 9 shows another alternative embodiment of the invention in sectional elevation view.
Figure 10:
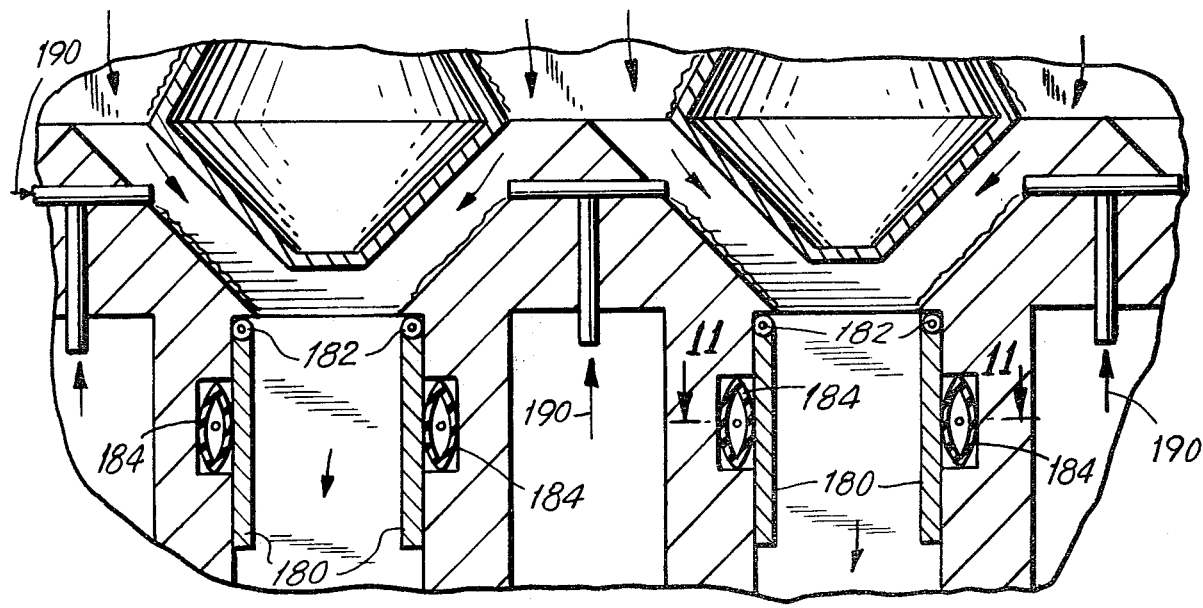
FIG. 10 shows still another alternative embodiment of the invention in sectional elevation view.
Figure 11:
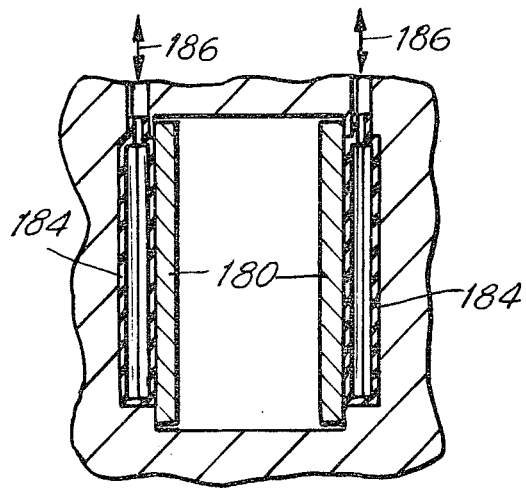
FIG. 11 is a partial sectional plan view taken substantially along the line 11—11 of FIG. 10.

FIG. 9 illustrates a simplified version of the FIGS. 6–8 arrangement, in which only a single baffle 174 is provided in conjunction with a container 176. The phantom outline shows the orientation of elements 174 and 176 when gas flow rate diminishes and a throttling of the approach section of the venturi scrubber is desired, i.e. the container 176 expands due to introduction of pressurizing fluid and baffle 174 moves upwards towards inverted frusto-conical baffle 178.

Figure 12:
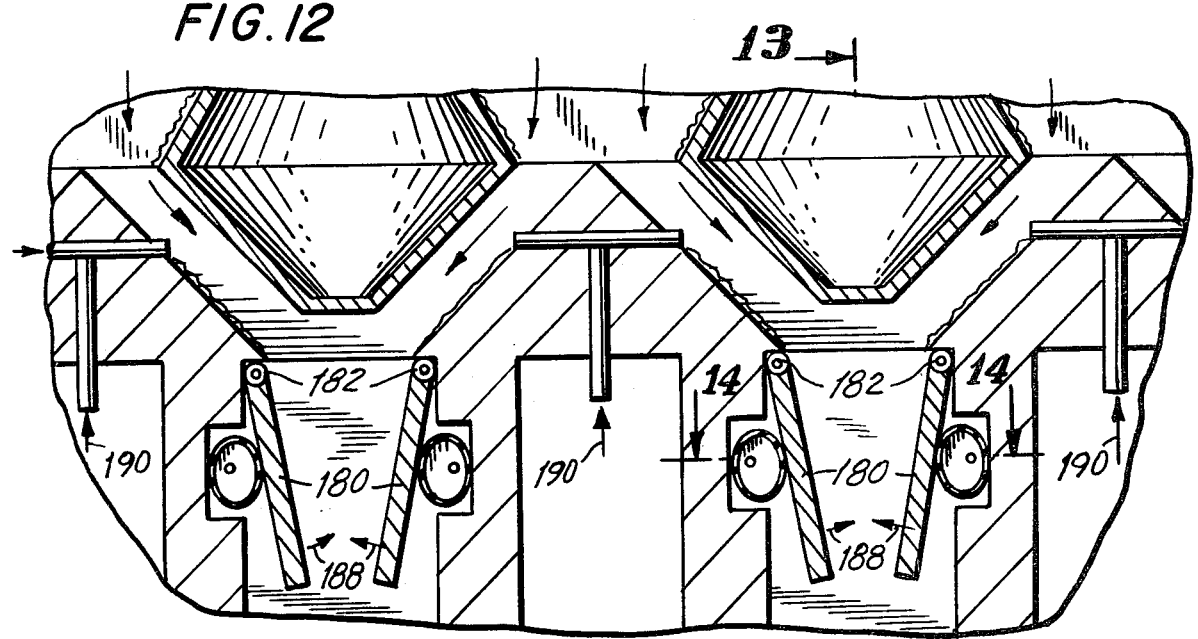
FIG. 12 is a sectional elevation view of the FIG. 10 embodiment but with the containers inflated.
Figure 13:
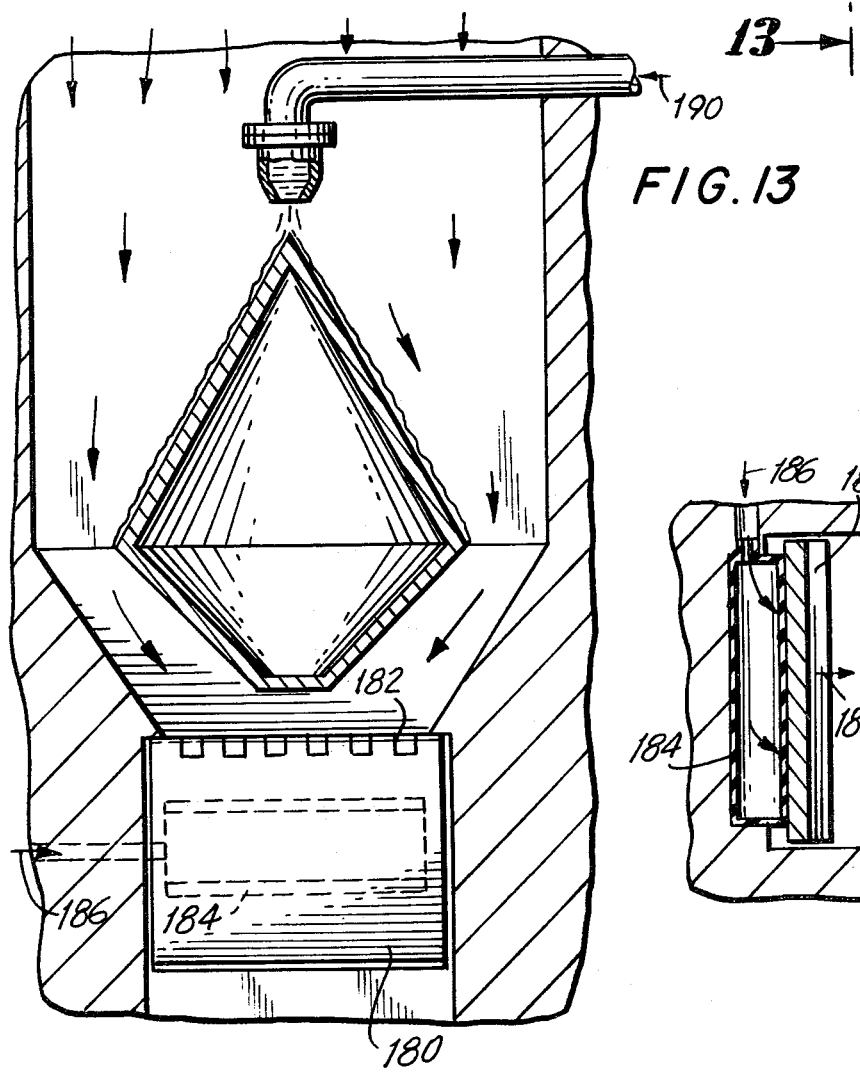
FIG. 13 is a sectional elevation view taken substantially along the line 13—13 of FIG. 12.
Figure 14:
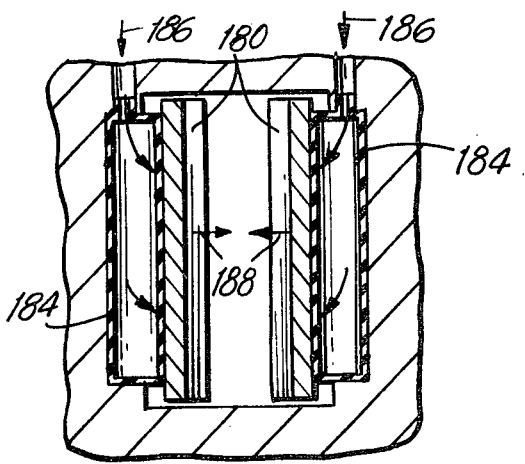
FIG. 14 is a partial sectional plan view taken substantially along the line 14—14 of FIG. 12.

FIGS. 10–14 illustrate an alternative embodiment of the invention in which hinged baffles 180 are disposed in the throat sections of parallel oblong horizontal venturi passages having vertically downwards fluid flow. The baffles 180 are generally rectangular elements (FIG. 13) which are hinged at their upper ends 182. As seen in FIGS. 12 and 14, when the containers 184 are expanded through introduction of pressurizing fluid via streams 186, the baffles 180 swing about their upper hinges 182 in the direction indicated by arrows 188, so that the throat section of the venturi scrubber is adjusted to a constricted and throttled dimension, which is contingent upon reduced gas flow rate or the like. Scrubbing liquid is introduced via streams 190.

Figure 15:
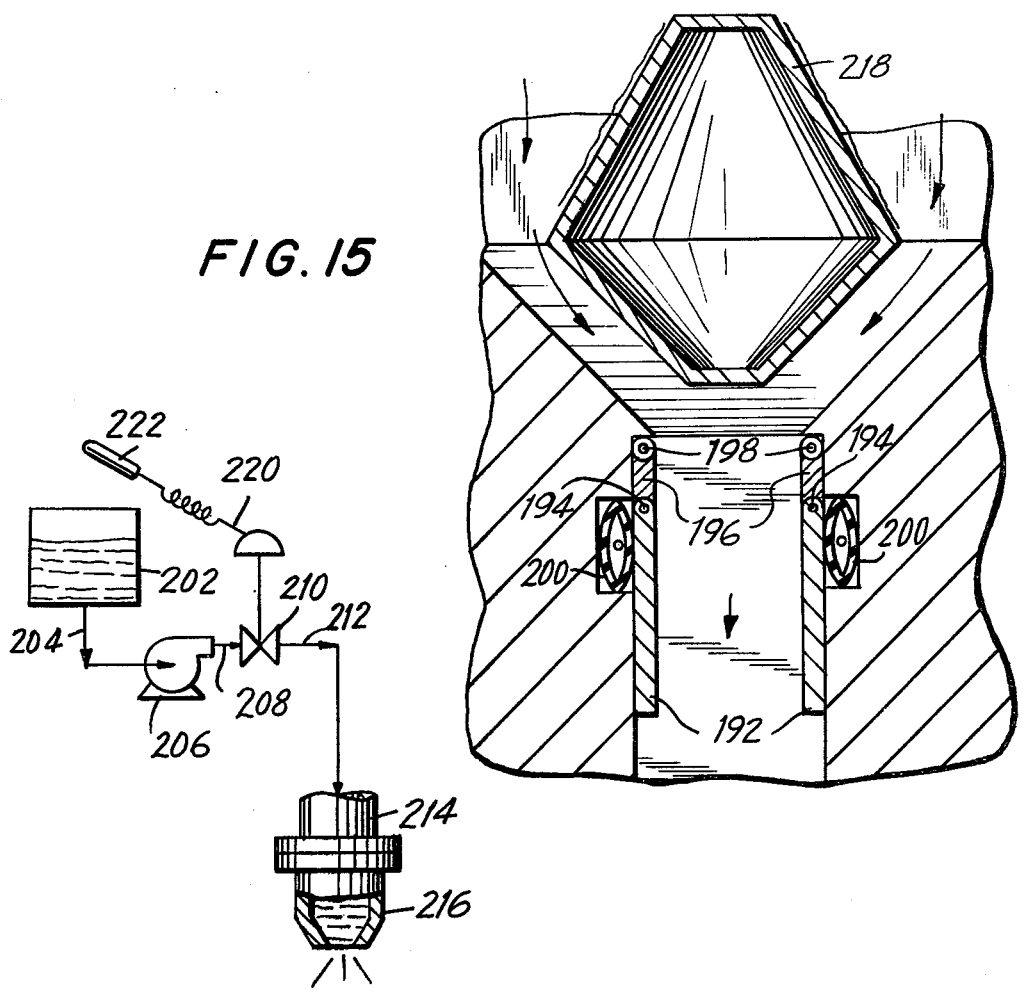
FIG. 15 is a sectional elevation view showing still another alternative embodiment of the invention.
Figure 16:
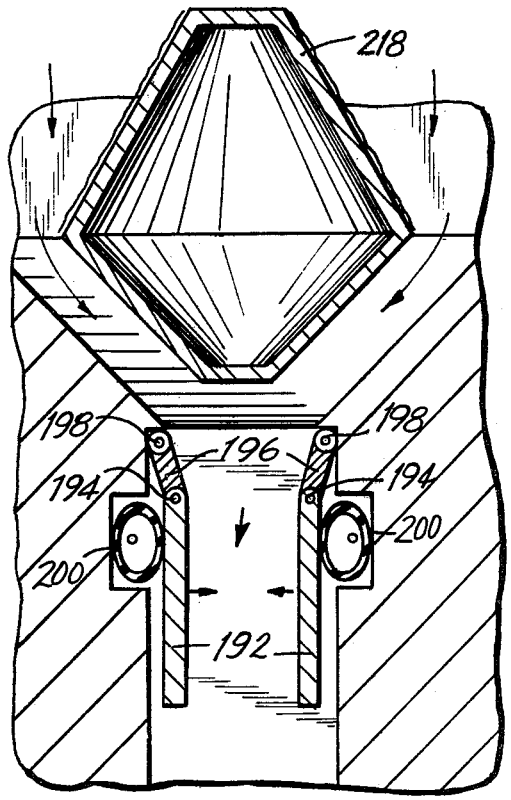
FIG. 16 shows the FIG. 15 embodiment with the container inflated and the throat of the venturi passage constricted.

FIGS. 15 and 16 illustrate an alternative version of hinged baffle, in which the main baffles 192 are connected via upper hinges 194 to auxiliary baffles 196, with the upper ends of the auxiliary baffles 196 also being hinged at 198. The purpose of this arrangement is so that when the container 200 is inflated (FIG. 16), the venturi throat will not be tapered as in FIG. 12 but instead will be of uniform throttled and constricted cross-sectional area, which in some instances is more desirable due to reduced gas pressure drop through the venturi scrubber system.

FIG. 16 also illustrates a typical control circuit for adjustment of scrubbing liquid flow rate, which in some cases may be a concomitant to change in gas flow rate. Scrubbing liquid from tank 202 flows via stream 204, pump 206 and stream 208, through control valve 210 and via stream 212 to pipe or duct 214 and nozzle 216, and thence onto frusto-conical baffle 218 of the venturi scrubber. The flow rate of stream 212 is controlled by control valve 210 which receives a pneumatic or electronic signal via line 220 from sensor 222, which may extend to or be connected in conjunction with container 200.

FIG. 17 shows a rectangular, e.g. square, venturi throat in which the position of the lateral baffles 224 is adjusted by containers 226, so that when gas flow rate diminishes, the cross-sectional area of the throat will be reduced to that shown in phantom outline.

FIGS. 18, 19 and 20 illustrate still another alternative version of the invention, in which the baffle is in two curved sections 228 and 230 which are mutually co-extensive and define a circular approach section and throat by a funnel-shaped configuration. The sections 228 and 230 are composed of flexible resilient plastic or rubbery material such as those materials of construction for the container mentioned supra. Expansion of annular container 232 through introduction of pressurizing fluid via stream 234 causes, as seen in FIG. 20, the baffles 228 and 230 to slide around each other and to constrict the cylindrical throat, with the baffles 228 and 230 converging uniformly in a circular manner, so that the venturi throat constricts as indicated by arrows 236. A fluid-impervious flexible resilient connection 238 is provided between the upper end of baffle 228 and the outer wall 240 of the converging section of the venturi scrubber, and a similar connection 242 is provided between the upper end of baffle 230 and the outer wall 240.

It thus will be seen that there is provided an adjustable throat venturi scrubber which achieves the various objects of the invention and which is well adapted to meet the conditions of practical use.

As various possible embodiments might be made of the above invention, and as various changes might be made in the emments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. An adjustable throat venturi scrubber for the scrubbing of a gas stream with a liquid which comprises a venturi scrubber having an approach section and a throat section, said approach section being a converging gas passage which terminates at and is connected to said throat section, said throat section being a gas passage having a restricted cross-sectional area, means to pass an inlet gas stream successively through said approach section and said throat section, whereby said gas stream is accelerated to a high velocity in said throat section, means to project a scrubbing liquid stream into said gas stream at or adjacent to said throat section, whereby said scrubbing liquid stream is comminuted into a plurality of discrete small liquid droplets within said gas stream and said gas stream is thereby scrubbed, said throat section extending to means to separate the resulting gas-liquid mixture into a scrubbed gas phase and a scrubbing liquid phase containing a component removed from said inlet gas stream, and means to adjust the cross-sectional dimension of the gas passage at or adjacent to said throat section, said adjustment means comprising at least one movable baffle at the periphery of said gas passage and a container, said container being composed of a flexible and resilient material, said container being external to and contiguous with said baffle, together with means to pass a controlled amount of a fluid into said container whereby the internal fluid pressure within the container and resultant volumetric dimension of said container, and resultant displacement of said baffle relative to the periphery of said throat section, are adjustable in proportion to a change in the flow rate of said inlet gas stream.

2. The adjustable throat venturi scrubber of claim 1 in which the gas passage is of circular cross-section.

3. The adjustable throat venturi scrubber of claim 2 in which a central substantially conical baffle is provided in the approach section so that an annular gas passage is provided in the approach section.

4. The adjustable throat venturi scrubber of claim 3 in which the central conical baffle is frusto-conical.

5. The adjustable throat venturi scrubber of claim 3 in which an inverted substantially conical baffle depends from the central conical baffle.

6. The adjustable throat venturi scrubber of claim 5 in which the inverted conical baffle is frusto-conical.

7. The adjustable throat venturi scrubber of claim 1 in which the gas passage is of rectangular cross-section.

8. The adjustable throat venturi scrubber of claim 7 in which the gas passage is of square cross-section.

9. The adjustable throat venturi scrubber of claim 1 in which the baffle is composed of two connected sections, a first baffle section being disposed in the terminal portion of the approach section and a second baffle section being in the inlet portion of the throat section.

10. The adjustable throat venturi scrubber of claim 9 in which an auxiliary baffle is disposed between the first baffle section and the terminal portion of the approach section, the container being external to said auxiliary baffle, the terminal edges of said auxiliary baffle being connected to the inner wall of the gas passage at or adjacent to the throat section by at least one fluid-impervious connection, at least a portion of said fluid-impervious connection being expandable to accommodate for displacement of said auxiliary baffle relative to the inner wall of the gas passage.

11. The adjustable throat venturi scrubber of claim 1 in which the fluid is a gas selected from the group consisting of air, nitrogen and carbon dioxide.

12. The adjustable throat venturi scrubber of claim 1 in which the fluid is a liquid selected from the group consisting of water, a hydrocarbon oil, a hydraulic brake fluid, and a silicone oil.

13. The adjustable throat venturi scrubber of claim 1 in which the component removed from the inlet gas stream is sulfur dioxide.

14. The adjustable throat venturi scrubber of claim 13 in which the scrubbing liquid stream is an aqueous solution containing a dissolved hydroxide, sulfite or carbonate of an alkaline or alkaline earth element selected from the group consisting of sodium, potassium, lithium, magnesium, calcium and barium.

15. The adjustable throat venturi scrubber of claim 13 in which the scrubbing liquid stream is an aqueous slurry containing discrete solid particles of an oxide, hydroxide, sulfite or carbonate of an alkaline earth element selected from the group consisting of magnesium, calcium and barium.

16. The adjustable throat venturi scrubber of claim 1 in which the component removed from the inlet gas stream is a plurality of discrete solid particles initially entrained in the inlet gas stream.

17. The adjustable throat venturi scrubber of claim 16 in which the discrete solid particles are fly ash.

18. The adjustable throat venturi scrubber of claim 1 in which the container is expandable.

19. The adjustable throat venturi scrubber of claim 18 in which the container is composed of an expandable material selected from the group consisting of natural rubber, synthetic rubber, and a deformable plastic.

20. The adjustable throat venturi scrubber of claim 19 in which the synthetic rubber is selected from the group consisting of neoprene, hypalon and buna.

21. The adjustable throat venturi scrubber of claim 1 in which the approach section consists of an inverted frusto-conical baffle.

22. The adjustable throat venturi scrubber of claim 1 in which a diverging gas passage depends from the throat section.

23. The adjustable throat venturi scrubber of claim 22 in which the diverging gas passage is a frusto-conical baffle.

24. The adjustable throat venturi scrubber of claim 1 together with a baffled or cyclonic gas-liquid separation container, together with means to pass the resulting gas-liquid mixture into said gas-liquid separation container, so that the scrubbed gas phase and the scrubbing liquid phase containing the removed component are formed within the gas-liquid separation container.

25. The adjustable throat venturi scrubber of claim 1 in which the scrubbing liquid stream is projected substantially transversely into the gas stream.

26. The adjustable throat venturi scrubber of claim 1 in which the venturi scrubber is one of a plurality of parallel vertical gas scrubbing passages, said parallel vertical gas scrubbing passages being oblong substantially linear passages juxtaposed across the path of inlet gas stream flow in a common horizontal plane.

* * * * *